United States Patent
Hirneisen et al.

(10) Patent No.: US 7,207,010 B2
(45) Date of Patent: Apr. 17, 2007

(54) METHOD AND DEVICE FOR IDENTIFYING SPECIES OF ANIMALS, PLANTS, AND/OR TYPES OF MINERALS

(76) Inventors: Norbert Hirneisen, Orchideenweg 12, D-76571 Gagenau (DE); Christian Koeppel, Orchideenweg 12, D-76571 Gagenau (DE)

( * ) Notice: Subject to any disclaimer, the term of this patent is extended or adjusted under 35 U.S.C. 154(b) by 512 days.

(21) Appl. No.: 10/192,765

(22) Filed: Jul. 10, 2002

(65) Prior Publication Data
US 2003/0030677 A1   Feb. 13, 2003

(30) Foreign Application Priority Data
Jul. 10, 2001   (DE)   ............................. 101 32 767

(51) Int. Cl.
*G06F 17/00*   (2006.01)
(52) U.S. Cl. ................ 715/810; 715/762; 715/866; 707/100; 707/102
(58) Field of Classification Search ........ 715/514–516, 715/864, 762, 503–504, 738–743, 765, 810, 715/764, 866; 707/1, 2, 10, 100, 102, 103 R, 707/103 Y, 103 X, 103 Z
See application file for complete search history.

(56) References Cited

U.S. PATENT DOCUMENTS

| | | | | |
|---|---|---|---|---|
| 6,307,573 | B1* | 10/2001 | Barros ...................... | 715/764 |
| 6,537,213 | B2* | 3/2003 | Dodds ....................... | 600/300 |
| 6,816,175 | B1 | 11/2004 | Hamp et al. | |
| 2002/0019864 | A1* | 2/2002 | Mayer ....................... | 709/223 |

FOREIGN PATENT DOCUMENTS

| | | |
|---|---|---|
| DE | 197 35 191 | 8/1997 |
| DE | 199 60 043 | 12/1999 |
| EP | 0 897 249 B1 | 2/1999 |

OTHER PUBLICATIONS

Martin, et al., "Reginal endemism and cryptic species revealed by molecular and morphological analysis of a widespread species of Neotropical catfish," Jan. 11, 2000.*
Gigon, et al., "Blue Lists of the successfully promoted threatened plant and animal species: a new tool for conversation and restoration," Apr. 2000.*
Vijay Aswani and Eldredge Bermingham, "Mapping Biodiversity in Central America," 1999.*
Synopsis of content of CD-ROM in German and English translation thereof, 2001.

* cited by examiner

*Primary Examiner*—Tadesse Hailu
(74) *Attorney, Agent, or Firm*—Collard & Roe, P.C.

(57) ABSTRACT

Method and a device for identifying species of plants and/or animals and/or types of minerals, as well as parts of them or products made from them, as well as the location of their occurrence, in each instance.

Figure 1:
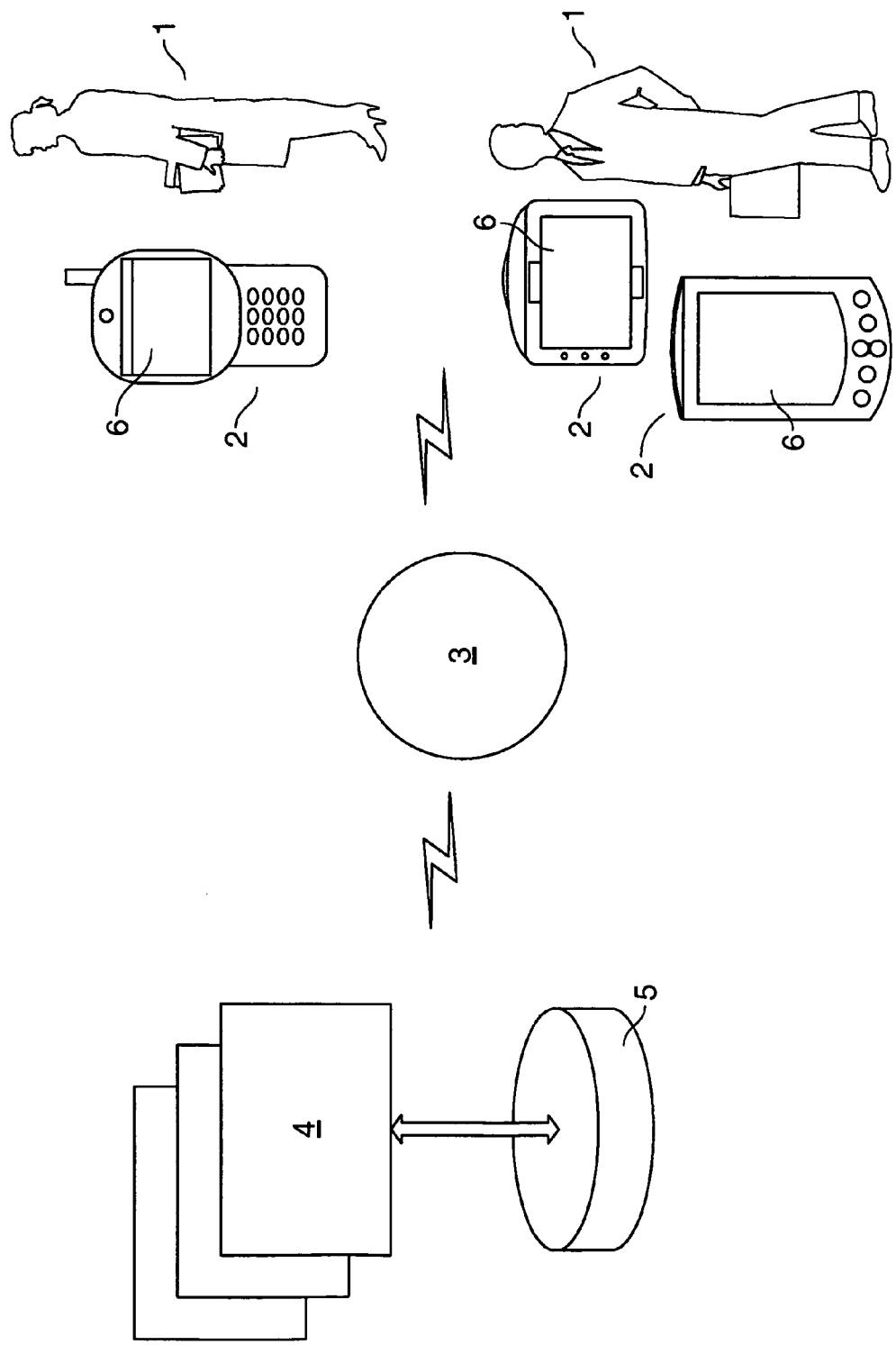

Proceeding from database systems already known from the state of the art, for identifying specific species of animals and/or plants, the invention creates a method and a device for identification, with which identification of species of animals and/or plants is made possible by means of mobile data display terminals (2), such as mobile telephones that communicate via the UMTS, GPRS, or word protocol, for a user (1) in the field, in that the characteristics necessary for identification of a concrete outward appearance are offered for selection, one after another, by way of a matrix of characteristics from a central database (5). The method for identification is optimized by means of a system of error correction. In addition, the location of occurrence can be identified using this device, and can be recorded for purposes of protecting the species and protecting nature.

16 Claims, 3 Drawing Sheets

METHOD AND DEVICE FOR IDENTIFYING SPECIES OF ANIMALS, PLANTS, AND/OR TYPES OF MINERALS

The invention relates to a method and a device for identifying species of plants and/or animals and/or types of minerals, as well as parts of them or products made from them, using a database, a data display terminal, and a menu control assigned to the database.

Such an identification method has already been made available recently, in the form of a CD-ROM entitled "Erich Götz—Pflanzen bestimmen mit dem Computer" [Erich Goetz—Identifying plants by computer] from Ulmer Verlags GmbH. Using this CD, an interested user can identify plants using a modern data processing device with a CD reader, using a visualized dichotomous identification key.

At least since the Washington treaty for the protection of endangered species, a set of rules that regulates the import and export of a total of approximately 30,000 protected species, there has been not only scientific interest in the identification of species, also in connection with implementation of the provisions of the treaty, but also an increasing need to be able to clearly identify species of animals and/or plants. Any databases or manuals that exist in this connection, which work predominantly with dichotomous identification keys, offer only limited help here, since they are generally directed at experts and require the user to follow a logic decision tree, which is a time-consuming and complicated process. In this connection, the use of the biological name, with fork-like branching in the case of algae, mosses, or ferns, derived from the Greek concept of dichotomy, logically requires two-part identification of a term by means of a selection of sub-characteristics assigned to this term. This logical figure necessarily has the result that a single incorrect decision will result in incorrect identification of the species in question. It is obvious that such identification literature is rather complicated and difficult to handle.

Based on this set of problems, in the sector of arachnology, the group of inventors Nentwig, Hänggi, Kropf, and Blick has presented a noteworthy approach for identifying spiders on the Internet. This group of inventors tries to offer an identification key, at least for the spiders of Central Europe, on the Internet, and to present it for discussion. There, too, work is being done on being able to publish this identification key in the form of a CD. The group of inventors has great expectations for the dynamic medium of the Internet, in order to be able to provide the constant updating of the identification key that will be necessary. In this connection, different keys are used, depending on the user qualifications.

For example, a family key that relates only to adult spiders is aimed at "beginners." The advantage of the solution being offered here certainly lies in the dynamics of the identification key, the use of this identification key being aimed primarily at users who have both a microscope and access to the Internet. This system is directed at a small group of users and can furthermore not be used in the field, but only at home or in the laboratory.

Proceeding from this state of the art, the invention is based on the task of creating a method and a device for identifying species of animals and/or plants that makes it possible for an untrained user, if necessary even in the field, to quickly and easily identify species of animals and/or plants. In this connection, identification of the species is supposed to be made usable by the largest possible group of users, as an additional monitoring instrument to determine their occurrence.

This task is accomplished by means of a method and a device according to claims 1 and 10. Advantageous embodiments of the invention can be derived from claims 2 to 9 as well as 11 to 19.

In the method according to the invention, because the data collected in a database for every concrete outward appearance are offered to the user in an easy-to-understand representation in the form of a matrix of characteristics, the user can quickly be guided through the identification process, by means of appropriate menu guidance. The identification process is facilitated for the user in that he/she is always given only a small selection of the characteristics that are relevant in each instance. By means of intelligent menu guidance, the user neither has to see all the characteristics at once, nor does he/she have to monitor the selections made by him/her previously.

Independent of or in addition to the method of identification, a method for determining the occurrence of the concrete outward appearance, in each instance, is created. In this connection, the location data that are necessary for operation when using mobile devices, particularly mobile phones, wireless LAN GPS devices, or, if necessary, manual input of these data, are utilized for identifying the place of occurrence. The increasingly wide-spread use of mobile data processing devices is thereby advantageously utilized to monitor species or for protection of species. Especially when larger segments of the population are involved, a new quality of protecting nature and/or species is made possible.

The ease of use and thereby the speed of identification is increased in that the characteristics are grouped together in groups of characteristics. These are preferably geographical, phenological, and optical characteristics. The preliminary selection of phenological characteristics, in particular, in other words the time of occurrence of a specific species, but also the use of the geographical information, results in a significant reduction in the amount of data to be processed, on the basis of very simple data. This makes the use of the database significantly faster. Selection by way of groups of characteristics furthermore increases the ease of use for the user.

For an untrained user, it is helpful to group the characteristics in plates, particularly in connection with optical characteristics. The representation of species-specific characteristics in plates spares the user from having to read long texts, and can be used by means of simple comparisons in the field.

In this connection, the identification process can be at least partially structured in the form of a logical decision tree. For menu guidance in the form of a logical decision tree, characteristics of time and location of the species to be identified, which can be determined without any doubt, are particularly useful.

However, a decisive advantage of the method according to the invention is that the method includes error processing. Thus it is fundamentally possible, within the scope of the process according to the invention, to select characteristics even if they preclude one another. This might be particularly necessary because the deviations within a single species can be significant and also, optical perception can be clouded also by external influences. The method according to the invention solves this problem in that in such a case, the identification process is not concluded with a clear result, but instead, several possible species are displayed to the user.

In another embodiment, a more detailed matrix of characteristics can be offered on the basis of the species selected, in order to possibly allow identification of the species actually found, after all.

Another or additional possibility of error correction can be that a display is given to the user, by means of menu guidance, showing the decision on the basis of which he/she left a pattern that was clear up to that point, so that the user has the possibility of verifying this characteristic once again. This repeat identification of a specific characteristic can also be supported by offering more detailed characteristics.

A significant auxiliary characteristic within the scope of identifying species according to the invention is that the user can get a visual display of the characteristics that have already been identified, at any time. This can be done, for example, by means of an image on which the regions of characteristics that have already been identified are marked. For example, in the case of a butterfly, the eyes, legs, wings, or other characteristics can be emphasized with a particular color, in order to indicate that the user has already made a selection with regard to these characteristics.

The task on which the invention is based is also accomplished by means of a device according to claim 10.

The decisive advantage of the device according to the invention is that identification is essentially carried out using a data display terminal that is connected to a central database of a server, with either wired or wireless connection. The use of data display terminals, in particular of so-called "mobile devices," has increased significantly in recent years. The spread of "mobile devices" was particularly promoted by a constant increase in computer performance and memory capacity, with a simultaneous miniaturization of these devices. This makes it possible today to carry devices with significant computing capacity as handheld devices.

Such a mobile data display terminal can be used, independent of the identification of concrete outward appearance, or in addition to it, to enter into data exchange with the server and the database established there, in the field, after an appropriate dial-up process, in order to carry out identification in the field, using the method according to the invention. Of course, instead of a mobile data display terminal, a stationary data processing device can also be used in connection with the method according to the invention.

In connection with mobile data processing devices, when logging onto a mobile telephone network, a rather precise indication of location necessarily takes place, by way of the location of the mobile data display terminal. This location information generally cannot be used further for reasons of privacy protection, so that alternatively the user can be asked for the corresponding location information. This location information represents important information in connection with identification, and therefore can be included in the identification process either automatically or manually. In this connection, entry of the data into the central database can take place in real time, during the identification process, or with a time delay afterwards, in other words on-line or off-line.

Since image displays significantly facilitate identification according to the above explanations, it is advantageous if the new types of mobile telephone protocols GPRS, UMTS, wireless LAN, or WAP are utilized for wireless transmission of the database information.

In connection with the menu guidance according to the invention, the mobile data display is provided with a scrolling operating element, for example a trackball or wheel, in order to be able to scroll through the individual data. Furthermore, a selection key or similar operating element must be provided for the selection of a specific characteristic. In this connection, the scrolling operating element and the selection key can be combined.

Menu guidance can be significantly facilitated by means of a speech input and output module. In this connection, acoustical identification of species can be carried out via the speech input and output, for example using a speech computer.

It is advantageous if the central server provided for operation of the database is operated in connection with an Internet portal, to call up the information stored in it via the Internet. Such an Internet portal makes it possible to make available a number of additional data that usually cannot be made accessible to the mobile data processing network because of the large amounts of data. Furthermore, the Internet portal allows inexpensive access via the TCP/IP protocol of the Internet.

The location information of the user that occurs in connection with the identification of concrete outward appearances are preferably recorded anonymously, and therefore allow not only an identification of species, but also information about the occurrence of species. The data collected in this way are visualized on the Internet portal in a map image, for example, and can be viewed and called up by the users. The device according to the invention therefore allows not only identification of species, but furthermore makes available an important instrument for monitoring and determining the occurrence of species. The spread of "mobile devices," as already mentioned, and their almost unlimited possibility of being taken along, thereby represents a completely new type of instrument, and a powerful one, for monitoring the occurrence of species and regulations to protect nature and species.

For this purpose, the database (15) is brought together with data concerning so-called Red and Blue Lists, in order to document the numbers and the occurrence of endangered species and plants.

In order to increase not only the attractiveness of the Internet portal but also the efficiency of management of the database (15), the Internet portal is structured as a virtual community, in known manner, where known tools of voting and/or ranking are also made available, in order to assess identifications input by users, for example, or to estimate the endangerment potential of species. The creation of the Red and Blue Lists is therefore the result of cooperation within the virtual community.

Furthermore, the server is operated in connection with a so-called user database. These databases represent an important protocol instrument for the users. Particularly in the case of species identification in the field, the user is not able, in most cases, to store the data recorded and identified using the mobile data processing device in memory. The limited memory capacity of the mobile data processing device also does not offer any remedy here.

It is therefore a significant advantage that if needed, a memory location is made available to the user on the central server, where the data generated and determined by him/her can be stored, at least in temporary memory, for later processing.

Furthermore, user profiles, preferably fee-oriented user profiles, can be stored on the central server. As a function of the user profile, in each instance, specific database regions are made available to the user or blocked. For example, users who are interested exclusively in the identification of butterflies can subscribe to only this database region. Independent of this, specific species for which it is in the public interest to obtain as much information as possible can be made available to the users free of charge, as a fundamental policy. This includes the species protected according to the Washington treaty for the protection of endangered species, for example.

The invention will be explained in greater detail below, using an exemplary embodiment that is shown only schematically in the drawing. This shows:

FIG. 1 a fundamental diagram with a device for identification, and

Figure 2:
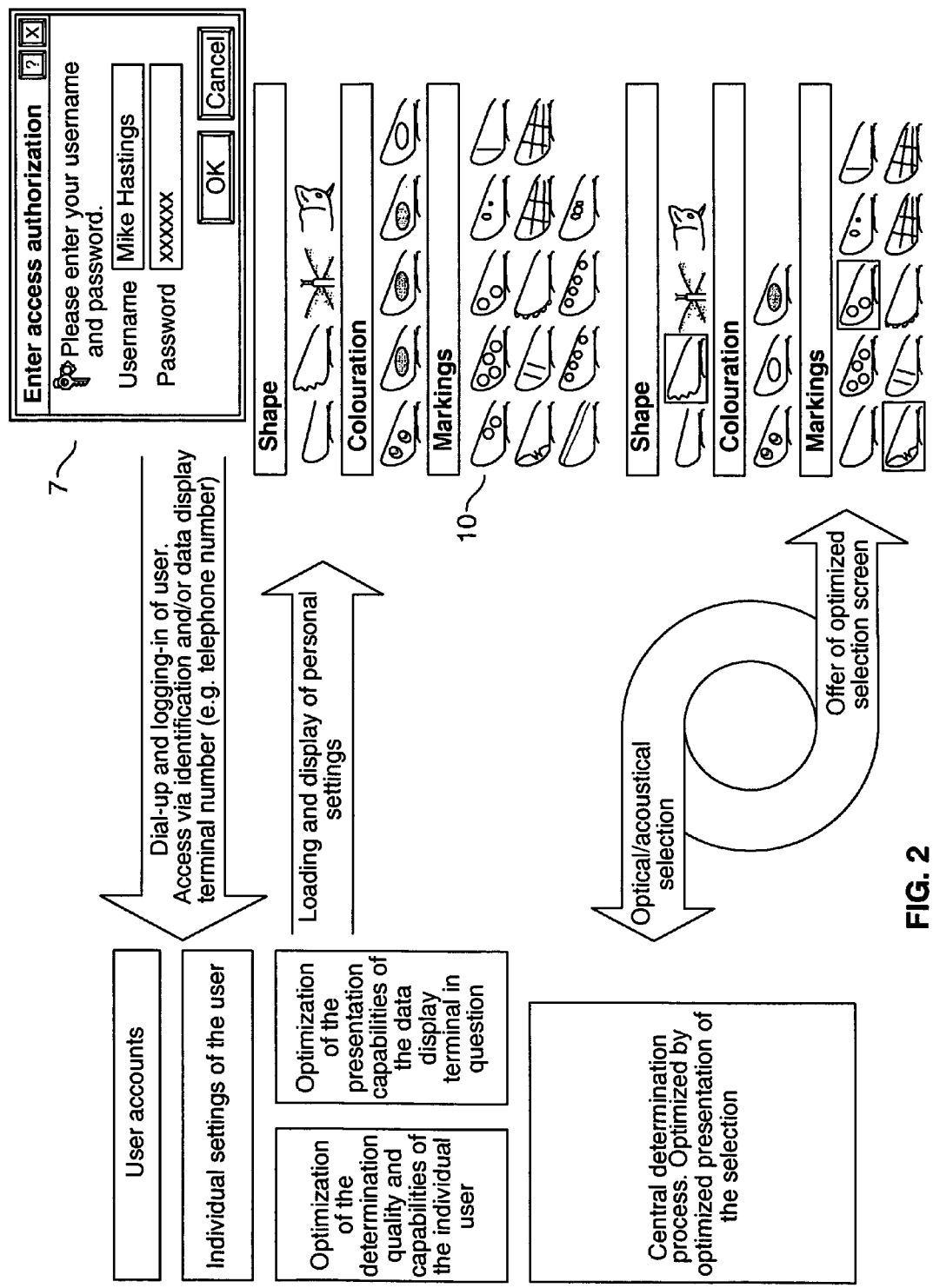

FIG. 2 a flow chart of a segment of a method of identifying species, and

Figure 3:
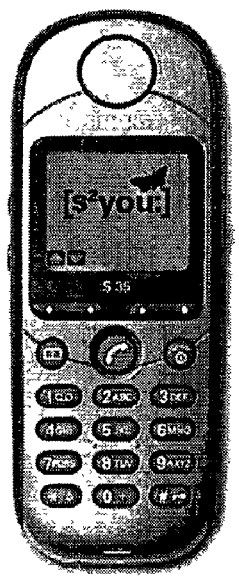

FIG. 3 a mobile data display terminal for implementing the method for identifying species as shown in FIG. 2.

In accordance with the fundamental diagram in FIG. 1, a large number of users 1 are in data connection with a central server 4, by way of mobile data display terminals 2, via a wired or wireless network 3.

The central server 4 comprises a database 5 with all the data stored with regard to species of animals and/or plants.

The mobile data display terminal 2 comprises a display device 6 for visualizing the information obtained from the server 4. The mobile data display terminals 2 can be mobile telephones of the modern generation, which can receive and exchange data according to the GPRS or UMTS or WAP protocol, or wireless-LAN Internet-based data. The server 4 is a conventional web server that is operated in connection with an Internet portal. All the services and data of the server 4 can be called up via the Internet portal, as well as by the mobile data display terminals 2. The Internet portal is established in an HTML or future XML code. The database 5 therefore comprises the characteristics assigned to a concrete outward appearance, in orderly form, in other words organized by categories. The characteristics themselves are organized according to optical, geographical, and phenological characteristics.

Furthermore, the database is provided with a modern retrieval system, in other words a database guide. The menu control of the database 5 essentially ensures that the characteristics organized in groups of characteristics are offered to the user in a specific sequence and form. This first of all relates to calling up data that are processed in the form of a logical decision tree.

In this connection, what is involved is, in particular, the geographical and phenological characteristics that result in a preselection of the data offered to the user.

Subsequently, the identification process takes place using the optical characteristics. The optical characteristics are offered in the form of a matrix 10 of characteristics, which is arranged in rows and columns. In this connection, the rows indicate the individual characteristics, and the columns assigned to each row indicate the different degrees to which these characteristics are marked. In this connection, the database 5 is compiled in such a way that not all the known characteristics of a known outward appearance, but rather only a selection of these characteristics is stored in memory, in order to be able to carry out the identification process in as short a period of time as possible.

Therefore the work is carried out with a system using fuzzy logic, which operates with several levels of characteristics, at first. This means that if a clear identification of species is possible on the basis of a first run, this quick and short path is used first, and a more detailed selection of characteristics is offered only in the case of a doubtful or imprecise or incorrect identification. Furthermore, the menu control is provided with its own error handling. According to the latter, the user 1 is shown that he/she is leaving a pattern that was previously clearly established, if this happens. Furthermore, known deviations from characteristics within a single species are also entered into the database 5. In the following, a method of identification is visualized schematically, using the example of a butterfly.

FIG. 2 shows a flow chart of part of the method of identifying a species. First of all, according to the representation in FIG. 2, a different process is carried out, and the user data are transmitted to the server 4 by the mobile data processing device 2, by way of an input screen 7. For this, the user uses a program stored in the data processing device, preferably in the form of a Java script or an Applet, which has the advantage that it is independent of a specific operating system. The user logs onto his/her user account in this way. After the user identification has been checked, the user 1 receives access to the database 5 connected with the server 4, in accordance with his/her individual user profile.

In particular, in view of the preliminary setting by the user, particularly relevant databases 5 such as those for a specific taxon, such as butterflies, shellfish, or plants, can be released, for example.

Furthermore, the qualifications of the user can also be stored with the user profile. Depending on the user's qualifications, particular characteristics or databases of characteristics are offered. For example, no characteristics that can be checked only using special equipment such as microscopes or chemical analysis equipment will be transmitted to an amateur user.

Furthermore, the information as to what mobile data processing device 2 is preferably used by the user 1 can be stored in the user profile. If this is a mobile phone, for example, with a correspondingly small display area, the form of representation selected will usually be different than if the user is working on a 17-inch or 19-inch monitor of a computer.

Finally, a matrix 10 of characteristics is offered to the user in accordance with the preliminary settings. The matrix 10 of characteristics is divided into rows and columns, where the rows represent the individual characteristics and the columns represent the degree to which these characteristics are marked. The user is now guided through the matrix 10 of characteristics, using a special menu control. In this connection, the selection of characteristics from this matrix 10 of characteristics, for identifying a species, can be made optically or acoustically.

In a first step, the user selects a certain category.

The group of possible concrete outward appearances or species is first drastically reduced by means of additional inquiries with regard to time and location of the identification process.

Subsequently, the matrix 10 of characteristics shown in FIG. 2, in particular, is offered in the form of a plate with different characteristics. Here, the matrix of characteristics works particularly with those characteristics that are particularly well suited for a corresponding visualized representation, and which utilize a selection process that is as easy as possible. In this connection, the menu control comprises error handling in such a way that a display is given to the user 1, as soon as he/she starts to depart from a previously established pattern. For this purpose, a differentiation is made in the database 5 between unambiguous and ambiguous characteristics. Ambiguous characteristics are understood to mean those that can occur in different ways, on the basis of deviations from characteristics within a single species. Here, the database 5 is structured dynamically as a learning system, which is constantly updated on the basis of the user entries, but also on the basis of appropriate management of the data system.

A significant component of the identification method is that not only an identification of the concrete outward appearance, but also monitoring of their occurrence by place and time can be carried out, on the basis of the communication with mobile data display terminals. The place and time of the occurrence is either input by the user manually, or automatically determined by appropriate GPS modules or other positioning of the mobile data display terminal 2, and entered into the database 5, if necessary.

The data display terminal 2 can be, for example, a mobile telephone according to FIG. 3, which is equipped with the special software for identifying species, as mentioned, and which communicates with a central server in known manner.

The above therefore describes a device and a method for identifying species of animals and/or plants or parts of them, such as ivory, fruits, or seeds, and products, such as tobacco and illegal drugs, which allows the user fast and uncomplicated identification in the field. Fundamentally, surfaces, materials, or other products or product characteristics can be used for an identification process and, in the final analysis, an identification, using this method.

The data of location and time that occur in this connection are used for additional monitoring. Furthermore, additional functions such as recording his/her identifications are offered to the user 1 on the server 4.

Furthermore, post-processing tools for identification are available to the user 1 on the server 4.

REFERENCE SYMBOL LIST

1 user
2 mobile data display terminal
3 network
4 server
5 database
6 display device
7 input screen
10 matrix of characteristics

The invention claimed is:

1. Method for identifying species of plants and/or animals and/or types of minerals, as well as parts of them or products made from them, using a database, a data display terminal (2), and a menu control assigned to the database,
wherein
a user (1), after having selected a category, is offered a matrix (10) of characteristics that is assigned to this category, for identifying a concrete outward appearance that falls within this category, on the data display terminal (2), where
lines indicate the different characteristics, and
columns of the matrix (10) of characteristics indicate the different forms of the characteristics, and
the user (1) is guided through the matrix (10) of characteristics, line by line, by means of the menu control,
until the concrete outward appearance is identified or the identification process is interrupted;
wherein if characteristics that preclude one another are selected, several concrete outward appearances of the category in question are identified and displayed to the user (1), if applicable; and
wherein any incorrect selections are recognized and displayed to the user (1), and the characteristic in question is offered for a new identification process.

2. Method according to claim 1, wherein the matrix (10) of characteristics comprises characteristics selected for each category, which are preferably grouped in groups of characteristics, particularly according to
geographical,
phenological,
optical
characteristics, and which are offered to the user (1) for selection, organized in these groups.

3. Method according to claim 2, wherein at least part of the characteristics of the matrix (10) of characteristics is offered for selection visualized in plates.

4. Method according to claim 1, wherein the menu control works through a logical decision tree at least for a partial segment of the identification process, in such a way that the selection of the characteristics being offered, in each instance, is carried out as a function of the characteristics selected previously.

5. Method according to claim 1, wherein if several concrete outward appearances are identified, a more detailed matrix (10) of characteristics is offered to the user, with additional characteristics for further identification of the concrete outward appearance.

6. Method according to claim 1, wherein the menu control comprises an auxiliary menu for display of the characteristics already selected, preferably by means of a pushup window.

7. Device for identifying species of animals and/or plants and/or types of minerals, as well as parts of them or products made from them, comprising a database (5), a data display terminal (2), and a menu control assigned to the database (5),
wherein the data display terminal (2) is preferably a mobile telephone, a personal digital assistant (PDA) or another data processing device, which is in a data connection or can enter into a data connection with the database (5), which is stored centrally on a server (4), by means of a wired or wireless connection, in such a way that after a dialup process, the user (1), after having selected a category, is offered a matrix (10) of characteristics to identify a concrete outward appearance under this category, on the data display terminal (2), where the lines of this matrix (10) of characteristics indicate the different characteristics, and the columns of this matrix (10) of characteristics indicate the different forms of the characteristics, and the user is guided through the matrix (10) of characteristics, line by line, until the concrete outward appearance is identified or the identification process is interrupted; and
means wherein if characteristics that preclude one another are selected, several concrete outward appearances of the category in question are identified and displayed to the user (1), if applicable; and
means wherein any incorrect selections are recognized and displayed to the user (1) and the characteristic in question is offered for a new identification process.

8. Device according to claim 7, wherein the mobile data display terminal (2) is in data connection with the central server (4) by way of a mobile telephone protocol, preferably GPRS, UMTS, or wireless LAN.

9. Device according to claim 7, wherein the mobile data display terminal (2) is provided with an operating element for scroll menus and a selection key, preferably in combination.

10. Device according to claim 7, wherein the mobile data display terminal (2) is provided with a speech recognition module for speech input and output.

11. Device according to claim 7, wherein the central server (4) is in data connection with an Internet portal.

12. Device according to claim 11, wherein the database (5) comprises Red and Blue Lists with information about the numbers and occurrence of endangered plants and/or animals.

13. Device according to claim 12, wherein the Internet portal is provided with a communications platform for establishing a virtual community, as well as with a method of rating and/or voting for evaluating and assessing the database (5) and/or the data provided by the users (1), for identifying concrete outward appearances and/or their occurrence.

14. Device according to claim 7, wherein the location data that occur in connection with the identification process are brought together in a database, and can be called up via the Internet portal, preferably via a map representation.

15. Device according to claim 7, wherein at least part of the users (1) have a data memory location on the server (4) assigned to them, to store the data that occur in the species identification process.

16. Device for identifying the location of occurrence of species of animals and/or plants and/or types of minerals, as well as parts of them or products made from them, comprising a central database (5) that is stored on a central server (4), a mobile data display terminal (2), and a menu control assigned to this database (5), in which information concerning the location, in each instance, of the data display terminal (2) is automatically transmitted to the server (4) in connection with the dial-up process of the mobile data display terminal (2) to the server (4), preferably by means of radio positioning or a GPS module, or by means of manual input, and this information is entered into the database (5) in connection with the location information, on-line or off-line; and means wherein if characteristics that preclude one another are selected, several concrete outward appearances of the category in question are identified and displayed to the user (1), if applicable; and means wherein any incorrect selections are recognized and displayed to the user (1), and the characteristic in question is offered for a new identification process.

* * * * *